(12) United States Patent
Van Vliet et al.

(10) Patent No.: US 12,041,894 B2
(45) Date of Patent: Jul. 23, 2024

(54) ILLUMINATION DEVICE FOR PROVIDING OPTIMUM GROWING CONDITIONS

(71) Applicant: NGES Holding B.V., Nuenen (NL)

(72) Inventors: Wilhelmus Petrus Van Vliet, Nuenen (NL); Johannes Jacobus Smits, Hoek van Holland (NL)

(73) Assignee: NGES Holding B.V., Nuenen (NL)

( * ) Notice: Subject to any disclaimer, the term of this patent is extended or adjusted under 35 U.S.C. 154(b) by 0 days.

(21) Appl. No.: 17/909,120

(22) PCT Filed: Mar. 9, 2021

(86) PCT No.: PCT/NL2021/000002
§ 371 (c)(1),
(2) Date: Sep. 2, 2022

(87) PCT Pub. No.: WO2021/182947
PCT Pub. Date: Sep. 16, 2021

(65) Prior Publication Data
US 2023/0100956 A1 Mar. 30, 2023

(30) Foreign Application Priority Data
Mar. 10, 2020 (NL) ..................................... 1043597

(51) Int. Cl.
*A01G 7/04* (2006.01)
*F21V 29/61* (2015.01)
(Continued)

(52) U.S. Cl.
CPC .............. *A01G 7/045* (2013.01); *F21V 29/61* (2015.01); *F21V 29/673* (2015.01); *F21V 29/763* (2015.01); *F21Y 2115/10* (2016.08)

(58) Field of Classification Search
CPC ........ A01G 9/249; A01G 7/045; A01G 9/246; A01G 7/04; F21V 29/67; F21V 29/61; Y02P 60/14; F21Y 115/10
See application file for complete search history.

(56) References Cited

U.S. PATENT DOCUMENTS

| | | |
|---|---|---|
| 2015/0198321 A1 | 7/2015 | Druchinin |
| 2016/0178179 A1* | 6/2016 | Hanson ................. A01G 7/045 362/249.02 |

(Continued)

FOREIGN PATENT DOCUMENTS

| | | |
|---|---|---|
| EP | 1479286 A1 | 11/2004 |
| EP | 1859673 A1 | 11/2007 |

OTHER PUBLICATIONS

International Search Report and Written Opinion from Application No. PCT/NL2021/000002 dated Jun. 14, 2021.

*Primary Examiner* — William J Carter
(74) *Attorney, Agent, or Firm* — Troutman Pepper Hamilton Sanders LLP; Ryan A. Schneider; Dustin Weeks (57) ABSTRACT

An assimilation lamp device (101; 800) for stimulating plant and crop growth comprises: a central lamp unit (10), comprising a body (14) and one or more LEDs (12) mounted to the bottom surface of the body, wherein the body acts as a heat sink for the heat generated by the LEDs. The device further comprises air stream generating means (42) for generating a downward air stream (43; 341), and heat transfer and exchange means for transferring heat from the body to the air stream, so that heat from the LEDs is used to increase the temperature of said downward air stream and is eventually used to warm the environment of the plants. A device controller (850) has a set point input (859) and generates control signals for the LEDs and the air stream (Continued)

generating means in conformity with an input signal received at its set point input.

18 Claims, 5 Drawing Sheets

(51) Int. Cl.
*F21V 29/67* (2015.01)
*F21V 29/76* (2015.01)
*F21Y 115/10* (2016.01)

(56) References Cited

U.S. PATENT DOCUMENTS

2018/0135830 A1* 5/2018 Cai .......................... F21V 3/08
2021/0307269 A1* 10/2021 Massey .................. A01G 7/045

* cited by examiner

ILLUMINATION DEVICE FOR PROVIDING OPTIMUM GROWING CONDITIONS

FIELD OF THE INVENTION

The present invention relates in general to the field of plant growth, specifically but not exclusively the field of large-scale commercially growing plants for production.

BACKGROUND OF THE INVENTION

In greenhouses, crop like tomatoes, cucumber, pepper, or more in general plants, are cultivated for an optimal yield. It is a general desire that crop grows as fast as possible in order to be able to harvest as early as possible and to obtain a commercial value as high as possible. Apart from nutrients, the most Important growth factors are water, air (with a substantial percentage of carbon dioxide), temperature, and light, and a commercial plant grower will try to control these factors to some optimum values.

In modern greenhouses, artificial Illumination as part of creating an optimal set of conditions for the stimulation of crop or ornamental plant growth is quite common. Especially when sun light is fading and/or periods of daylight are getting shorter, like in autumn and winter season, artificial illumination of plants is essential for obtaining good growth. Such artificial illumination is also indicated as "assimilation lighting".

As the inventors have explained in their European patent 2975926, a system for stimulating plant growth has been developed that is based on LEDs. Light Emitting Diodes (LEDs) have all kinds of advantages, including compact size, high efficiency, and long life expectancy. In principle, an LED generates light within a narrow spectral range only but, in contrast to the sodium lamp whose narrow spectral range is fixed, it is possible to design an LED such that it generates Its light output in a desired spectral range. Of course, it Is possible to combine LEDs of different types, each generating light in mutually different spectral ranges, to obtain an overall light output having a certain desired spectral distribution. It is also possible to apply wavelength-conversion by providing an LED with suitable phosphors. As the document further describes, lamp units include a fan for generating a downward flow of air, a heat sink coupled to the LEDs, and a heat exchanger coupled to the heat sink and to the air flow. As a result, on the one hand, cooling of the LEDs is achieved, thus preventing damage of the LEDs. On the other hand, the air flow is heated, thus optimizing grow conditions of the plants Involved. Cooling the LEDs by heating the air flow thus has the effect that the heat generated by the LEDs is used in a more efficient manner, i.e. energy supplied to the LED array is used for light as well as for heat to achieve an energy saving and contributing to the growth of the plants Involved.

The present Invention alms to further elaborate on the above-described technology to further optimize an Illumination system for stimulating plant growth.

SUMMARY OF THE INVENTION

The present invention alms to use the heat generated by the LEDs in a more efficient manner, contributing to the growth of the plants involved.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
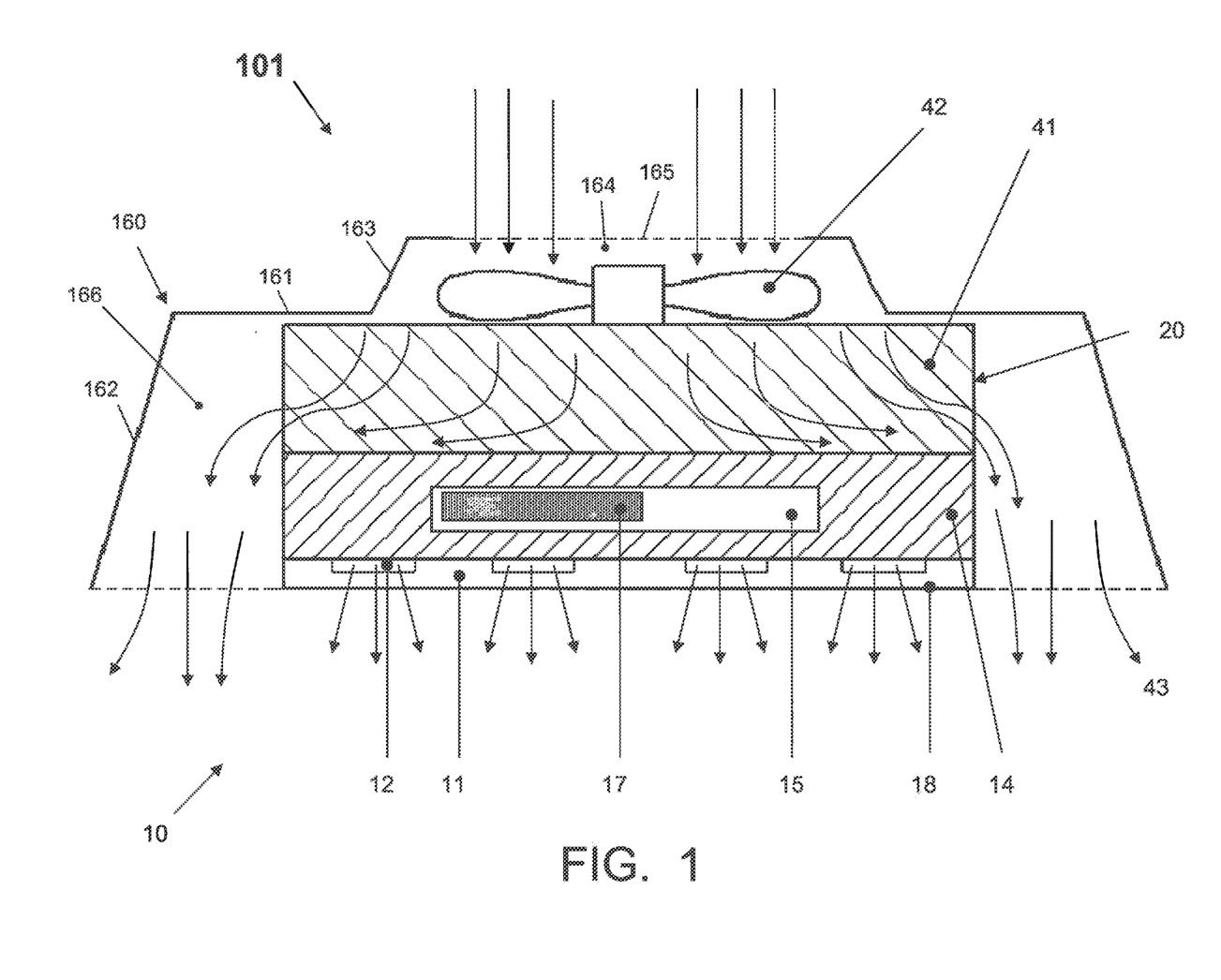
FIG. 1 schematically shows a longitudinal cross section of an exemplary embodiment of an assimilation lamp device according to the present invention.

FIG. 1 schematically shows an embodiment of a compact and relatively low cost assimilation lamp device 101 according to the present invention. The lamp device 101 comprises a central lamp unit 10 which includes a body 14 of a general rectangular block shape. The lamp device 1 further comprises a plurality of LEDs 12 mounted to an under surface of the body 14, preferably in a recessed portion 11 thereof. The body 14 has a cabinet 15 accommodating driving and control circuitry 17 for the LEDs. The cabinet 15 will receive an electric supply cable for electrical supply, but this is not shown for sake of simplicity. The driving and control circuitry 17 generates driving current for the LEDs 12, which current is transported to the LEDs via conductors extending through the body 14, but this too is not shown for sake of simplicity.

The LEDs may be selected to emit light in (different) parts of the 300-700 nm spectrum. A 300 W lamp version emits approximately 200 µmol/s, compared to a 600 W gas discharge sodium lamp which emits approximately 140 µmol/s. In this respect, a mol Indicates a number of photons, 1 mol being Avogadro's number, i.e. $6.02 \times 10^{23}$.

The LEDs 12 are mounted to have a good thermal conduction towards the body 14. The body 14 is made of a thermally well conducting material, for instance aluminum. Thus, the body 14 acts as a heat sink for the heat generated by the LEDs. This in any case has the effect that the temperature of the LED's remains at such a level that the lifetime of the LED's is not affected.

In the embodiment shown, the lamp device comprises a fan 42 or any other type of air stream generating means for generating a downward air stream 43, as well as heat transfer and exchange means 20 for transferring heat from the body 14 to the air stream 43, so that the air stream cools the body 14 and the heat from the LEDs 12 is used to warm said downward air stream 43. This warm air stream 43 ultimately reaches the plants, so that all in all the heat generated by the LEDs is not a loss any more but is advantageously used to warm the environment of the plants.

The invention can be implemented in several ways. One possible embodiment is Illustrated in the drawings and will be discussed below.

For enhanced heat-exchanging contact with the air stream 43, the body 14 is provided with at least one ribbed and/or finned heat exchanger structure. This structure may be attached to the body 14, but may also be formed integrally with the body 14. In the embodiment of FIG. 1, the heat exchanger structure(s) is/are arranged above the body 14.

While the body 14 primarily functions to carry the LEDs and to draw heat away from the LEDs in a vertical direction, the heat exchanger structure 20 functions to draw away heat from the body 14, allowing the body 14 to draw away more of the LED heat, and to exchange the heat with the air flow. In the embodiment shown, the heat exchanger structure 20 draws away heat from the body 14 in a substantial vertical direction. For the heat transfer from body 14 to heat exchanger structure 20, the heat exchanger structure 20 may be just mounted in heat transferring surface contact, but it is also possible that the body 14 and the heat exchanger structure 20 are provided with separate heat conductors or even heat pipes to promote the transfer of heat from body 14 to heat exchanger structure 20.

By way of example, the heat exchanger structure 20, which is preferably made from aluminium, includes a plurality of cooling fins or lamellae 41 that in between them define flowing paths for the air, extending in virtual planes substantially perpendicular to the heat conductor 40, i.e. vertical planes, at a mutual distance sufficient for allowing an air flow between such fins. Further, the heat exchanger structure 20 is provided with at least one fan 42 (or similar air stream generating means), for generating a downward air stream 43. Instead of one heat exchanger structure 20 having substantially the same size as the body 14, it is also possible to have two or more smaller heat exchanger structures. The air stream interacts with the respective heat exchanger structure, and heat is exchanged from said heat exchanger structure to the air so that the heat exchanger structure is cooled by the air and the air is warmed by the heat exchanger structure. Such air stream Is directed to the plants (not shown) below the lamps, and when the air stream reaches soil level it is deflected into a horizontal direction, distributing warm air over a larger surface area. In the preferred embodiment shown, the fan 42 is mounted on an upper surface of the respective heat exchanger structure, i.e. the heat exchanger structure Is arranged downstream of the respective fan.

Such a setup has the ultimate advantage that the LED-generated heat is not only transported away from the LEDs but is actually used to improve grow conditions for the plants. The fan(s) 42 generate(s) a vertical warm air circulation flow in the greenhouse, which in turn drives a horizontal warm air flow where the warm air flow is used to warm the leaves of the plants instead of being lost in the ridges of the greenhouse due to natural convection.

Therefore, such assimilation lamp 1 is very energy efficient, since all energy Input Is used to enable crop growth, by illumination as well as by temperature support.

It is noted that the fan 42 is arranged to generate a vertical air flow towards the heat exchanger structure 20; the air flow is blocked by the body 14 and is deflected in a horizontal direction. The precise horizontal direction is determined by the design of the heat exchanger structure 20.

Figure 2A:
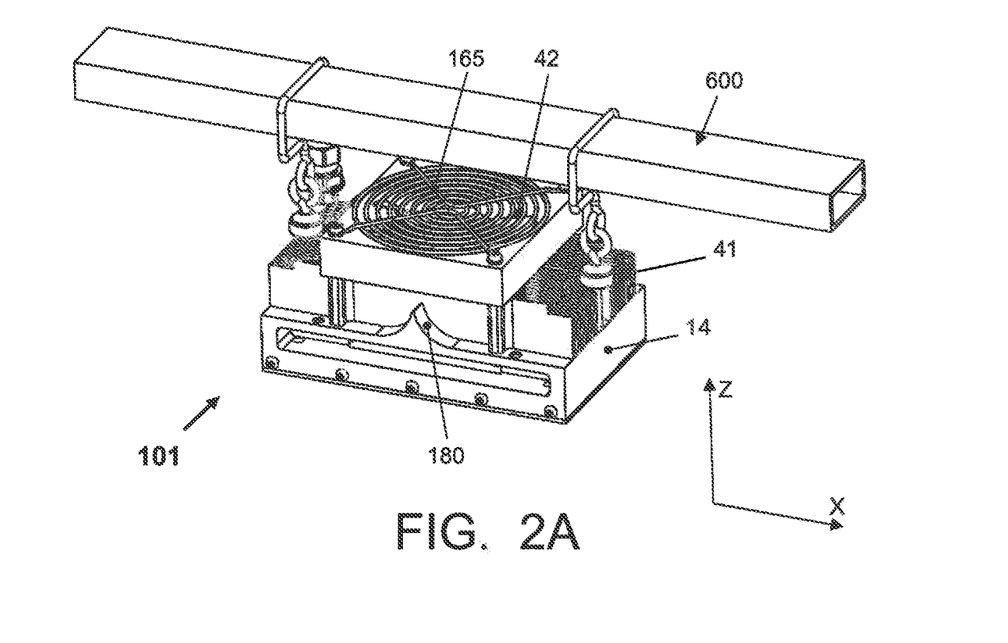
FIG. 2A is a schematic perspective top view of the assimilation lamp of FIG. 1, with the lamp cover removed.

FIG. 2A is a perspective top view of the assimilation lamp 101, suspended from a greenhouse beam 600, where it can be seen that the fins or lamellae 41 are all mutually parallel and extend in XZ-planes, with the X-direction parallel to the longitudinal direction of the assimilation lamp 101 which in practice will coincide with the longitudinal direction of the beam 600. In such case, the air flow leaving the heat exchanger structure 20 will be directed in the X-direction. While this in principle would be sufficient for the purpose of cooling the LEDs alone, it does not result in the beneficial downflow of warm air towards the plants.

To assure the downwards air stream 43, this embodiment of the assimilation lamp 101 comprises a guiding hood 160 having a substantially inverse-U shaped profile with a top wall 161 and substantially vertical side walls 162. At its underside, the hood 160 is open. The top wall 161 has a raised portion 163 having a central opening 164, provided with a protective grating 165. Under the opening 164, surrounded and protected by the raised wall portion 163, the fan 42 is arranged. The top wall 161 lies in close proximity to the upper side of the fins or lamellae 41, so that in operation air is sucked in via the opening 164 and is forced to pass between the body 14 and the top wall 161 of the hood 160, following in X-direction the flow channels between the fins or lamellae 41. In this X-direction, the hood 160 is wider than the body 14, so that a collective flow path is defined between the side walls 162 and the body 14 where the air can do nothing else but flow down in vertical direction, to exit the device at the underside of the hood 160, which may be flush with or lower than the lower surface of body 14. It is noted that, in X-direction, the fins or lamellae 41 may have the same size as the body 14, as shown, but it is also possible that these fins or lamellae may extend as far as to meet the hood side walls 162.

Figure 2B:
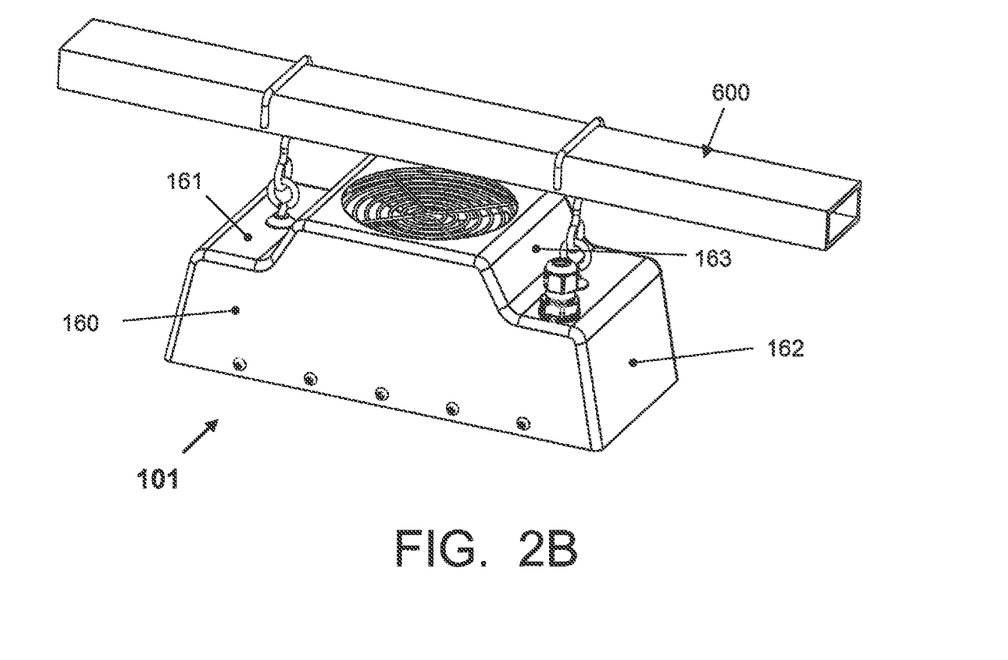
FIG. 2B is a schematic perspective top view of the assimilation lamp of FIG. 1, including the lamp cover.
Figure 3:
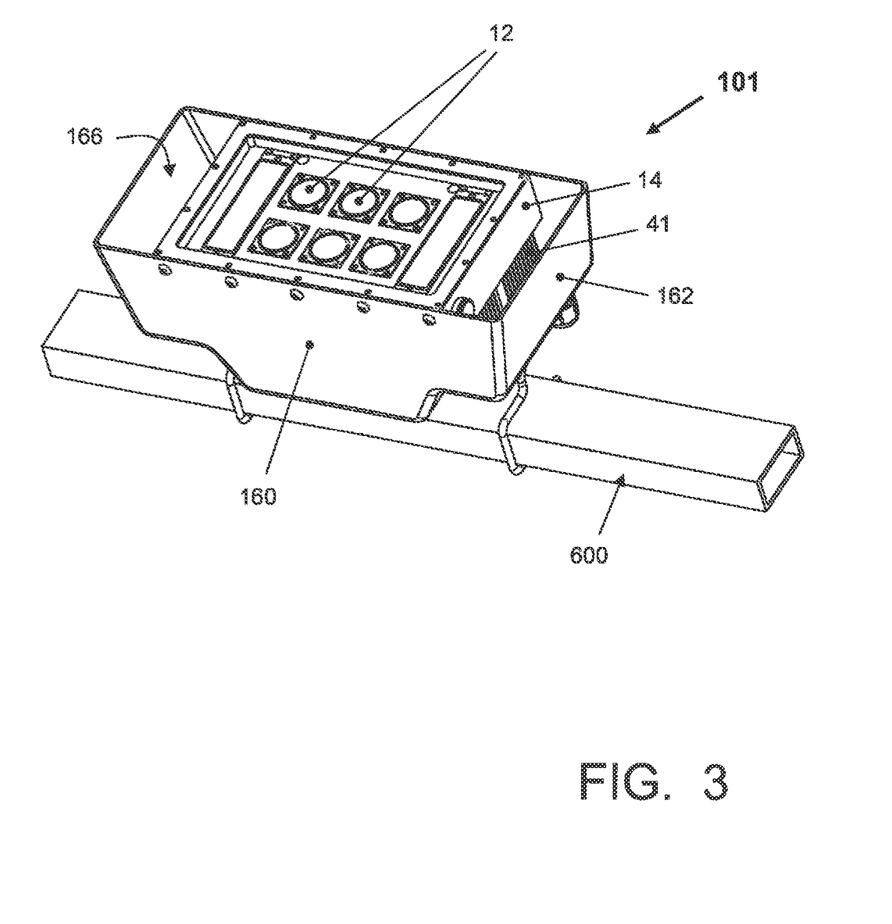
FIG. 3 is a schematic perspective bottom view of the assimilation lamp of FIG. 1.

In practice, the assimilation lamp 101 will typically be mounted in a greenhouse at a height between 3 and 6 meters. The greenhouse typically includes a construction frame having horizontal beams 600 of a certain width. In such greenhouse, the exposure of the crop to daylight (sunlight) should be maximised as much as possible, therefore shadow should be kept at a minimum. In this respect, it is of great advantage that the lamp according to the present invention has a slender construction and profile, with a width substantially corresponding to the width of the construction beam or only slightly larger. Thus, the present invention also provides a greenhouse design where an assimilation lamp device 101 is mounted under a construction beam 600, having its longitudinal direction aligned with the longitudinal direction of the construction beam 600, as Illustrated in FIGS. 2A, 2B, and 3.

Thus, for stimulating plant and crop growth, the present invention provides an assimilation lamp device that comprises a central lamp unit 10, comprising a body 14 and a plurality of LEDs 12 mounted to an under surface of the body 14, wherein the body 14 is made of a thermally well conducting material, for instance aluminum, and acts as a heat sink for the heat generated by the LEDs. The body 14 is provided with cooling fins or lamellae 41.

The assimilation lamp device further comprises air stream generating means 42 such as a fan for generating a downward air stream 43 in heat exchanging contact with the cooling fins or lamellae, so that heat is removed from the respective cooling block and used to increase the temperature of said downward air stream 43, i.e. the temperature of said downward air stream 43 downstream of the cooling fins or lamellae is higher than the temperature of said downward air stream 43 upstream of the cooling fins or lamellae.

In a further elaboration, the present invention provides for temperature control of the heated air.

It is desirable to be able to control the temperature of the air at the level of the plants. In practice, problems are experienced due to changing environmental conditions. As an example, a day/night cycle in the greenhouse may be mentioned. During the evening and night, screening curtains are employed in the roof part of the greenhouse, on the one hand to reduce light pollution of the surroundings, on the other hand to protect the plants from air that cools down close to the roof and tends to move down towards the plants. The curtains more or less act as a blanket, keeping the space below, with the plants, relatively warm and keeping the cooling air above. However, in the morning those curtains are opened, and the body of cold air above the curtains more or less drops down on the plants. Apart from a drop in temperature at plant level, this causes condensation of moisture contained in the warmer air, and this condensation on the plants is a potential threat to the plants as it allows for growth of bacteria and fungi.

The present invention aims to be able to counteract, among other things, this phenomenon.

Figure 4:
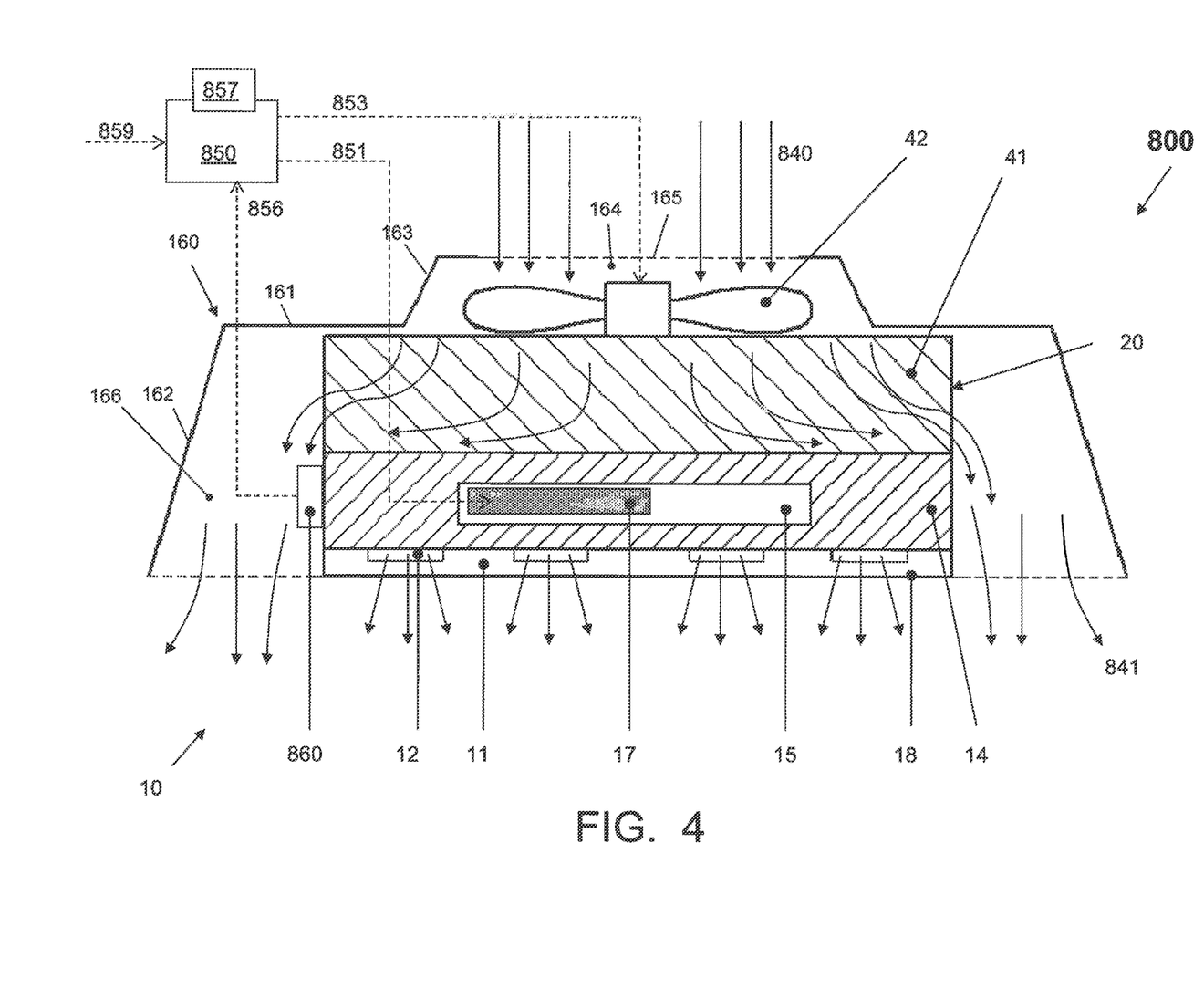
FIGS. 4 and 5 schematically Illustrate control of an assimilation lamp device according to the present invention.

FIG. 4 schematically illustrates an assimilation lamp device generally indicated at reference numeral 800. It may for instance be identical the device 101 discussed in the above. A stream of relatively cold air sucked in by the fan 42 is Indicated at reference numeral 840; this stream passes the heat sink/heat exchanger 14/20, and is blown out in a downward direction as warm air 841. Heat from the LEDs has been transferred to the air, so that the temperature of the air blown out is higher than the temperature of the air sucked in. The amount of temperature increase depends, among other things, on the temperature of the heat sink, which depends on the power supplied to the LEDs and can be controlled by controlling this power.

Reference numeral 850 indicates a device controller, having a LED output 851 coupled to the LED array 12 and having a fan output 853 coupled to the fan 42. The controller 850 further has a set point input 859. The controller 850 is adapted and configured to generate control signals for the LED array and the fan at the LED output 851 and the fan output 853, respectively, in conformity with an input signal received at its set point input 859. This can be a signal that is continuously present at the set point input 859 as a reference signal. However, it is preferred that the controller 850 has an associated setpoint memory 857 that stores a value representing a set point, while the input signal is a command signal to set or alter said value in said memory. In such case, the controller 850 is adapted and configured to generate control signals for the LED array and the fan at the LED output 851 and the fan output 853, respectively, in conformity with the setpoint value momentarily present in the setpoint memory 857.

It is noted in this respect that the wording "setpoint value" In this context does not necessarily mean just one particular value. The setpoint value may contain a combination of parameter values for, for instance, air flow speed and air temperature.

In a particular embodiment, the setpoint value only contains a parameter value for temperature, and the device controller 850 autonomously controls air flow speed and lamp power to obtain the target temperature as defined by said parameter value.

In a further particular embodiment, the setpoint value also contains a parameter value for actual air flow speed and/or for minimum air flow speed and/or for maximum air flow speed.

Control in the device controller 850 may be open-ended, i.e. without feedback. Preferably, however, the lamp device 800 is provided with at least one performance sensor 860 for measuring at least one performance value of the lamp device 800 and providing a performance feedback signal at a feedback Input 856 of the device controller 850. The performance sensed may for instance be the actual temperature of the heatsink and/or the actual flow speed of the air flow and/or the actual air temperature of the air flow.

In this respect, it Is noted that there will be a relationship between heat sink temperature and air temperature. Thus, controlling the one can be done by controlling the other, and for the purpose of explaining the present invention both are equivalent. However, for implementation, it is easier and more robust to measure the actual heat sink temperature instead of measuring the air temperature.

At all times, the device controller 850 will operate to control the lamp power and/or the fan speed such that the actual temperature of the heatsink and/or the actual flow speed of the air flow corresponds to the setpoint.

In the above, the LED power control is described as a control signal generated at LED output 851 and provided to the LED array 12 directly, i.e. to the LED control circuitry. While it is possible to arrange control in this manner, indeed, it would involve a complication that the LED currents to control are rather high, in the order of 2.5 A, and that components capable of performing such control are bulky and expensive.

In practice, for powering the LEDs a power supply unit (PSU) is provided. This may be a part of the lamp unit, but, in view of the large currents involved and the consequential large size of the PSU, this is in practice mostly an external power supply unit (PSU). According to the invention, such PSU is a controllable PSU, and the control signal generated by the controller 850 at the LED output 851 is coupled to a control input of the controllable PSU to control the operation of the PSU and to thus control the LED power. The control signal may include a signal defining a target value for the output current of the PSU. The control signal may include a failure signal causing the PSU to switch off the output current.

In case the PSU supplies two or more lamp units 800, the PSU is adapted to receive control signals identifying the individual lamp units, and the controller 850 is adapted to include in the control signal an identifier signal identifying for which lamp unit the control signal is intended.

Since the PSU typically is located remote from the lamp units 800, the signal path for the control signal may be wired but is preferably wireless.

The device controller 850 is part of the device 800. In other words, in a system having plural devices 800, there will be plural device controllers 850, each associated with and dedicated to a respective device 800.

Figure 5:
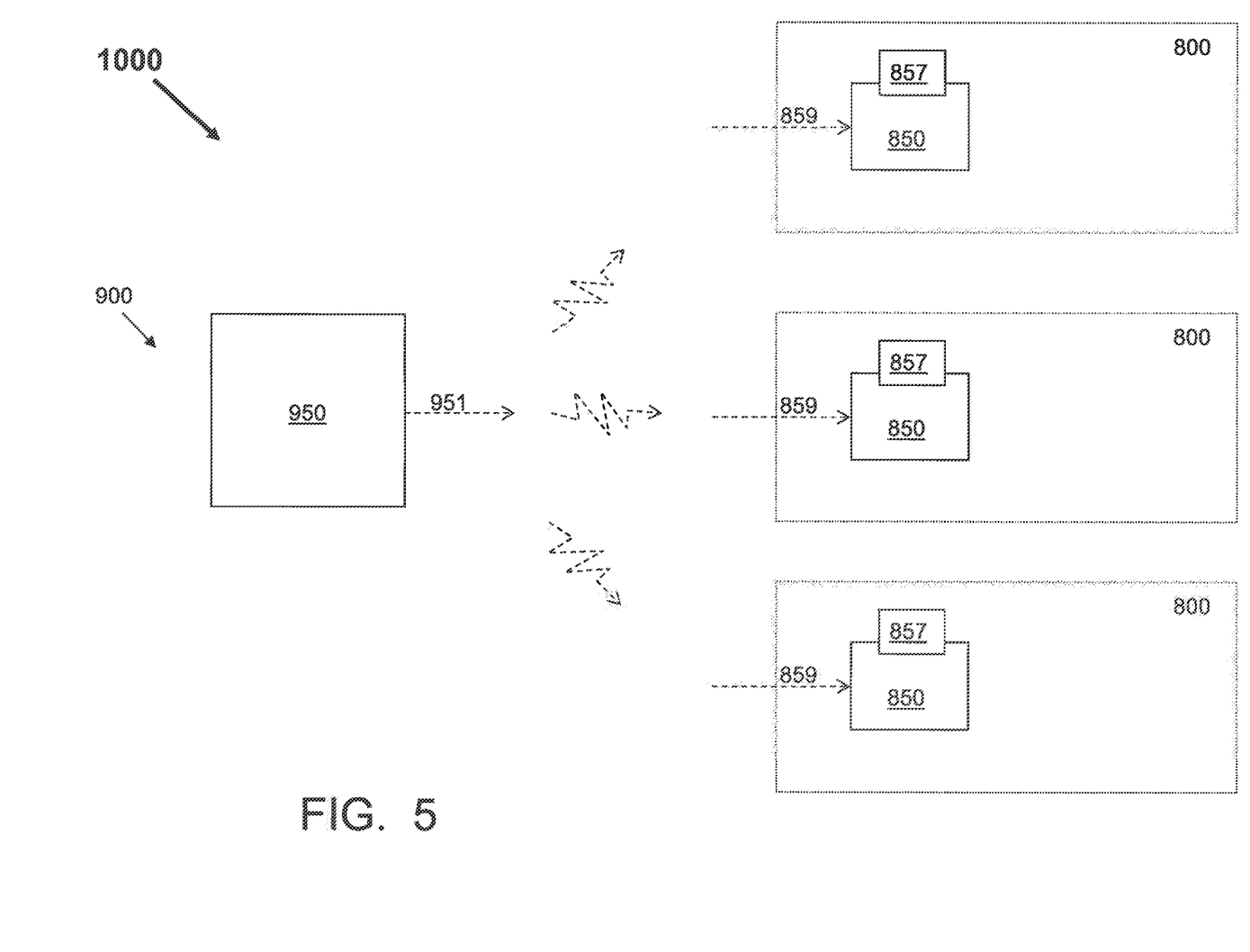

FIG. 5 schematically illustrates an illumination and heating system 1000 for use in a greenhouse, comprising a plurality of at least two assimilation lamp devices 800 and a common control arrangement 900 for controlling these assimilation lamp devices 800. In a typical situation in practice in a commercial greenhouse, having a surface area in the order of 100×100 square meters or more, the greenhouse will have about a 1.000 lamp devices, and it would be very impractical, or even impossible, to individually control the lamps by hand. The present invention envisages a control system 900 that comprises one master control device 950 for a plurality of lamps, ideally for all lamps.

The master control device 950 has a master control output 951 coupled to the various setpoint inputs 859 of the various device controllers 850. This coupling may be wired. Although each individual setpoint input 859 could be coupled to a respective terminal of the master control output 951 via a respective individual wire, it would be preferred to use a common communication bus system in which individual device controllers 850 are addressed by including an address signal with a command signal. Preferably, however, the coupling is wireless, and command signals from the master control device 950 include address signals, as is known per se so that further elaboration is not needed here.

The control arrangement 900 controls the illumination and heating system 1000 in the greenhouse by the master control device 950 communicating setpoint values to the various lamp devices 800. The master control device 950 may amend the settings in response to sensing signals received from sensors located at various positions in the greenhouse. Such sensors may sense for instance temperature, humidity, illumination level. The master control device 950 may amend the settings in accordance with a day/night rhythm.

At all times, each device controller 850 will operate to autonomously control the lamp power and/or the fan speed such that the actual temperature of the heatsink and/or the actual flow speed of the air flow and/or the actual air temperature of the output air flow of the corresponding lamp device 800 corresponds to the settings as communicated by the master control device 950.

It should be clear to a person skilled in the art that the present invention is not limited to the exemplary embodiments discussed above, but that several variations and modifications are possible within the protective scope of the invention as defined in the appending claims. For instance, two or more functions may be performed by one single entity, unit or processor. Even if certain features are recited in different dependent claims, the present invention also relates to an embodiment comprising these features in common. Any reference signs in a claim should not be construed as limiting the scope of that claim.

The central lamp body 14 preferably has such dimensions that an electronic cabinet 15 can be made to integrate additional functionality while the slender profile of the assimilation lamp 101 is maintained. Besides the possible storage of a power supply which drives the LEDs and the eventually present LEDs, also other features can be Installed. Possibilities are the installation of one or more sensors and sensor controllers in order to enhance the functionality of the assimilation lamp. E.g. a daylight sensor which can adjust the total amount of emitted light output of the LEDs as function of the available daylight. The amount of daylight can e.g. vary due to the season, or locally present clouds or mist. Further, an enhanced daylight sensor can, if required, even adjust the emitted light spectrum of the emitted LED-light, by controlling the light or colour output power balance between the available LEDs, assuming that different colours can be emitted by the assimilation lamp. Controlling and tuning the available different colours of the lamp allows the horticulturist or fruiter e.g. to mimic sunrise and/or sunset or to tune the light spectrum based on the demands of a particular crop. In case the assimilation lamps operate in a grid (which is normally the case in greenhouses), it is sufficient to provide e.g. only 1 out of 5 or 10 lamps with a smart sensor system, since the information acquired by this system can be used to control the other 4 or 9 passive assimilation lamps. In fact this creates a master-slave situation which reduces costs with a benefit in performance.

Other possibilities are the application of a sensor which can measure the amount of available carbon dioxide or a sensor which is able to determine the level of humidity. Based on sensor input and a response algorithm, the light output of one or more LED's of the lamp can be adjusted in such a way that the yield of crop or plants is accelerated.

The assimilation lamp is preferably equipped with a monitoring system that monitors critical lifetime affecting parameters like lamp body temperature (close to LED junction), outliers of power supply current and voltage. Further the total operational time of the lamp is monitored. Monitoring the lamp temperature (more precisely: the junction temperature) is important, since a high temperature significantly affects the LED lifetime. In order to prevent a LED lifetime threatening temperature, the temperature sensor controlling unit can decide to decrease the LED output power to such a level that the junction temperature is tempered and/or to increase the fan speed and thus the cooling capability, or can decide to completely switch off the lamp temporarily.

Since the assimilation lamp is equipped with at least one fan, an attractive and cost effective possibility is created to use the fan's functionality (thus without using the prime Illumination function of the lamp) for either the creation or enhanced stimulation of air flows through the greenhouse area in order to improve the mix-up of intentionally injected gas like carbon dioxide. Further, the sole fan functionality can be used during e.g. hot summer days to force down warm air which in a natural way gathers in upper parts of the greenhouse. This causes a mix of warm air with the cooler air in the lower parts of the greenhouse which creates a better micro environment for crop and consequently enhances growth.

The invention claimed is:

1. An assimilation lamp device configured to provide illumination and heat to a growing environment comprising:
   a central lamp unit located above the growing environment comprising:
      a body; and
      LEDs mounted to a bottom surface of the body;
      wherein the body is made of a thermally well conducting material and acts as a heat sink for heat generated by one or more of the LEDs;
   air stream generating means for generating a downward air stream flow;
   heat transfer and exchange means for transferring heat from the body to the downward air stream flow, so that LED-generated heat generated by one or more of the LEDs is transferred to the downward air stream flow and is eventually transferred by the heated downward air stream flow to the growing environment;
   a remote power supply unit for providing power to one or more of the LEDs; and
   a device controller and an associated temperature setpoint memory for storing a temperature setpoint value representing a temperature setpoint;
   wherein the device controller has a temperature setpoint input for receiving a temperature command signal to set or alter the temperature setpoint value in the temperature setpoint memory to a momentary temperature setpoint value; and
   wherein the device controller is configured to:
      generate power control signals that are coupled, via wired or wireless path, to the remote power supply unit for controlling power within a power range to all of the LEDs simultaneously in conformity with the momentary temperature setpoint value in the temperature setpoint memory; and
      autonomously control central lamp unit power to obtain a target downward air stream flow temperature in conformity with the momentary temperature setpoint value.

2. The assimilation lamp device according to claim 1, wherein the momentary temperature setpoint value also contains a parameter value for at least one of an actual air temperature of the downward air stream flow or an actual temperature of the heat sink.

3. The assimilation lamp device according to claim 1 further comprising at least one performance sensor for measuring at least one performance value of the assimilation lamp device and providing a performance feedback signal at a feedback input of the device controller.

4. The assimilation lamp device according to claim 3, wherein the performance value is at least one of an actual temperature of the heat sink or an actual air temperature of the downward air stream flow.

5. The assimilation lamp device according to claim 4, wherein the device controller is further configured to autonomously control a fan speed of the air stream generating means such that at least one of the actual temperature of the heat sink or the actual air temperature of the downward air stream flow corresponds to the momentary temperature setpoint value.

6. An illumination and heating system comprising:
at least two assimilation lamp devices, each according to claim 1; and
a control arrangement for controlling the assimilation lamp devices and comprising a master control device having a master control output coupled to the temperature setpoint input of the device controller of each of the assimilation lamp devices;
wherein the control arrangement controls air temperature at a level of plants in proximity to the growing environment by the master control device communicating setting setpoint values to the momentary temperature setpoint value for each of the device controllers of the assimilation lamp devices.

7. The illumination and heating system according to claim 6, wherein the the master control output is coupled to the temperature setpoint input of the device controller wirelessly.

8. The illumination and heating system according to claim 6, wherein the control arrangement further controls the illumination and heating system by the master control device communicating setting setpoint values to the momentary temperature setpoint value for each of the device controllers.

9. The illumination and heating system according to claim 6 further comprising sensors located at various positions in a greenhouse containing the illumination and heating system for sensing environment parameters and for generating sensor signals representing sensed parameter values;
wherein the master control device is configured to communicate changes to setpoint values to the momentary temperature setpoint value for each of the device controllers in response to the sensor signals.

10. The illumination and heating system according to claim 9, wherein at least one of the environment parameters is selected from the group consisting of temperature, humidity, and illumination level.

11. The illumination and heating system according to claim 6, wherein the master control device comprises clock means and is configured to communicate changes to the setpoint values to the momentary temperature setpoint value for each of the device controllers as a function of time and/or in accordance with a day/night rhythm.

12. The illumination and heating system according to claim 6, wherein each device controller is further configured to autonomously control a fan speed of the air stream generating means such that at least one of an actual temperature of the heat sink or an actual air temperature of the downward air stream flow corresponds to the momentary temperature setpoint values for each of the device controllers of the assimilation lamp devices as communicated by the master control device.

13. The illumination and heating system according to claim 6, wherein the master control device is configured to command at least one of the device controllers to increase/decrease a respective LED power in order to increase/decrease an air temperature of the respective downward air stream flow.

14. The illumination and heating system according to claim 6, wherein one or more of the power control signals includes an identifier identifying an individual assimilation lamp device.

15. The assimilation lamp device according to claim 1, wherein the thermally well conducting material comprises aluminum.

16. An assimilation lamp device for stimulating plant and crop growth in a growing environment comprising:
a central lamp unit located above the growing environment comprising:
a body; and
LEDs mounted to a bottom surface of the body;
wherein the body is made of a thermally well conducting material and acts as a heat sink for heat generated by the LEDs;
an air stream generator for generating a downward air stream;
a heat transfer and exchange unit for transferring heat from the body to the downward air stream, so that LED-generated heat generated by the LEDs is transferred to the downward air stream and is eventually transferred by the heated downward air stream to an environment of plants/crops in proximity to the growing environment; and
a device controller and an associated temperature setpoint memory for storing a temperature setpoint value representing a temperature setpoint;
wherein the device controller has a temperature setpoint input for receiving a temperature command signal indicative of a change to the temperature setpoint value, either to initially set the temperature setpoint value to a momentary temperature setpoint value, or to alter a previous temperature setpoint value to the momentary temperature setpoint value, in the temperature setpoint memory; and
wherein the device controller is configured to:
generate power control signals that are coupled, via wired or wireless path, to a power supply unit providing power to the central lamp unit for controlling power to all of the LEDs and to the air stream generator, in conformity with the momentary temperature setpoint value in the temperature setpoint memory; and
autonomously control central lamp unit power to obtain a target downward air stream flow temperature in conformity with the momentary temperature setpoint value.

17. An illumination and heating system for use in a greenhouse comprising:
at least two assimilation lamp devices, each according to claim 16; and
a control arrangement for controlling the assimilation lamp devices and comprising a master control device having a master control output coupled to the temperature setpoint input of the device controller of each of the assimilation lamp devices;
wherein the control arrangement is configured to control air temperature at a level of the plants/crops in proximity to the growing environment by the master control device communicating changes to the setpoint values to the momentary temperature setpoint value for each of the device controllers of the assimilation lamp devices.

18. A method comprising:
controlling the air temperature at the level of the plants/crops in proximity to the growing environment comprising an illumination and heating system according to claim 17 by:
  controlling power to all of the LEDs simultaneously, and controlling power to the air stream generator, which controls a temperature of the heated downward air stream from each of the assimilation lamp devices; and
  amending settings for each of the assimilation lamp devices via the master control device in response to sensing signals received from sensors located at various positions in the greenhouse.

* * * * *